(12) United States Patent
Brew et al.

(10) Patent No.: US 8,864,488 B2
(45) Date of Patent: Oct. 21, 2014

(54) HONEYCOMB EXTRUSION APPARATUS AND METHODS

(75) Inventors: Thomas William Brew, Corning, NY (US); Conor James Walsh, Campbell, NY (US)

(73) Assignee: Corning Incorporated, Corning, NY (US)

( * ) Notice: Subject to any disclaimer, the term of this patent is extended or adjusted under 35 U.S.C. 154(b) by 253 days.

(21) Appl. No.: 13/466,560

(22) Filed: May 8, 2012

(65) Prior Publication Data

US 2013/0300023 A1    Nov. 14, 2013

(51) Int. Cl.
| | |
|---|---|
| B29C 47/00 | (2006.01) |
| B28B 3/26 | (2006.01) |
| B29C 47/08 | (2006.01) |
| B30B 11/22 | (2006.01) |

(52) U.S. Cl.
CPC ........... B29C 47/0028 (2013.01); B28B 3/2672 (2013.01); B29C 47/0816 (2013.01); B28B 3/269 (2013.01); B30B 11/221 (2013.01)
USPC ................................. 425/382 R; 264/177.12

(58) Field of Classification Search
CPC ............................ B29C 47/0816; B28B 3/269
USPC .................... 425/382 R; 264/177.12
See application file for complete search history.

(56) References Cited

U.S. PATENT DOCUMENTS

| 6,991,448 | B2 | 1/2006 | Lubberts ....................... 425/381 |
| 7,914,724 | B2 | 3/2011 | Bookbinder et al. .... 264/177.12 |
| 2003/0001308 | A1 | 1/2003 | Shibagaki et al. ........ 264/177.11 |
| 2004/0197434 | A1 | 10/2004 | Lubberts ....................... 425/380 |
| 2007/0026188 | A1 | 2/2007 | Bookbinder et al. ........... 428/73 |
| 2011/0204544 | A1 | 8/2011 | Foster et al. ............. 264/177.12 |

FOREIGN PATENT DOCUMENTS

| GB | 2 172 841 | 10/1986 |
| JP | 2009-061683 | 3/2009 |

Primary Examiner — Alison Hindenlang
(74) Attorney, Agent, or Firm — Joseph M. Homa; Matthew B. McNutt

(57) ABSTRACT

A honeycomb extrusion apparatus includes first and second vanes with respective first and second face portions. First and second axial widths of a circumferential feed area are respectively defined between the first and second face portions and the outer feed surface of the die body. In further examples, methods include the steps of selectively adjusting the first axial width and the second axial width of the circumferential feed area by respectively adjusting the first and second vane relative to the mask. In further examples, a honeycomb extrusion apparatus includes a plurality of mask segments that each includes an inner peripheral surface portion. Each of the plurality of mask segments are independently adjustable along a respective radial axis.

17 Claims, 12 Drawing Sheets

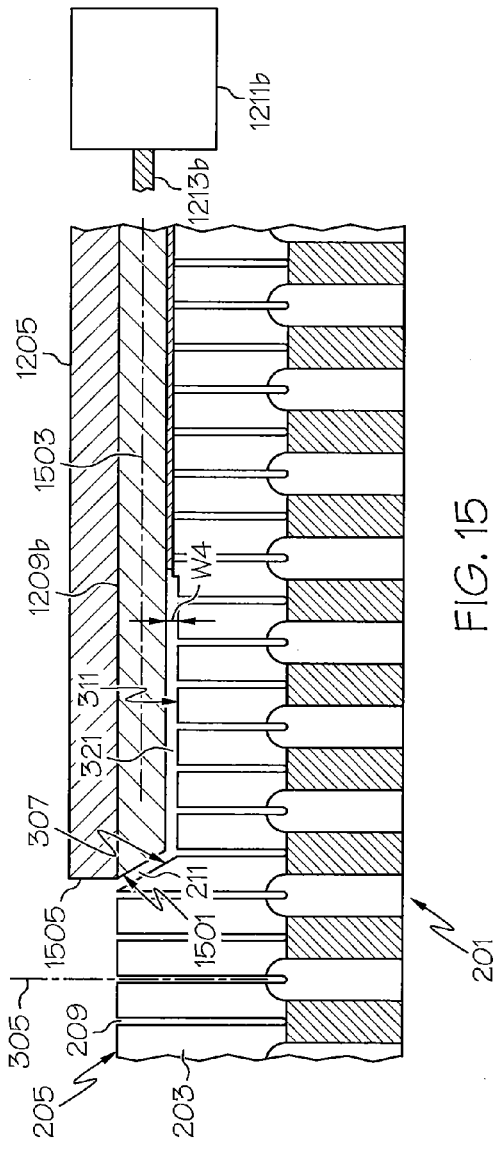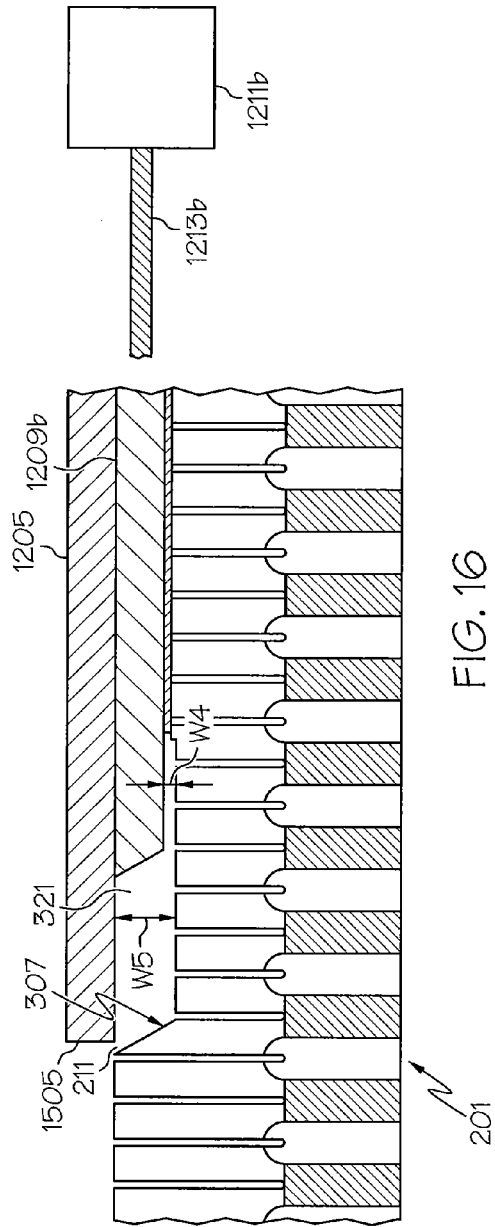

HONEYCOMB EXTRUSION APPARATUS AND METHODS

FIELD

The present disclosure relates generally to honeycomb extrusion apparatus and methods and, more particularly, to honeycomb extrusion apparatus and methods for co-extruding a honeycomb body with an integral skin.

BACKGROUND

Conventional honeycomb extrusion apparatus are known to be used to co-extrude a skin and a central portion of a honeycomb body. However, conventional techniques may result in uneven skin characteristics about the periphery of the honeycomb body.

SUMMARY

In one aspect, a honeycomb extrusion apparatus comprises a die body including an array of pins that are spaced apart to define an extrusion face with a honeycomb network of discharge slots extending along an extrusion axis of the die body. The die body further includes an outer peripheral surface facing away from the extrusion axis and circumscribing the extrusion face, and an outer feed surface circumscribing the outer peripheral surface. The honeycomb extrusion apparatus further includes a mask including an inner peripheral surface at least partially circumscribing the outer peripheral surface of the die body. A peripheral gap is defined between the inner peripheral surface and the outer peripheral surface. The honeycomb extrusion apparatus further includes a circumferential feed area in fluid communication with the peripheral gap and partially defined by the outer feed surface of the die body. The honeycomb apparatus still further includes a first vane including a first face portion, wherein a first axial width of the circumferential feed area is defined between the first face portion and the outer feed surface of the die body, and wherein the first vane is adjustably mounted with respect to the mask to selectively adjust the first axial width. The honeycomb apparatus also includes a second vane including a second face portion spaced radially inward with respect to the first face portion in a radial direction extending perpendicular to the extrusion axis and toward the extrusion axis. A second axial width of the circumferential feed area is defined between the second face portion and the outer feed surface of the die body with the second axial width being different from the first axial width. The second vane is adjustably mounted with respect to the mask to selectively adjust the second axial width.

In another aspect, a honeycomb extrusion apparatus comprises a die body including an array of pins that are spaced apart to define an extrusion face with a honeycomb network of discharge slots extending along an extrusion axis of the die body. The die body further includes an outer peripheral surface facing away from the extrusion axis and circumscribing the extrusion face. The honeycomb extrusion apparatus includes a mask including a plurality of mask segments that each includes an inner peripheral surface portion. The inner peripheral surface portions at least partially circumscribe the outer peripheral surface of the die body. Each of the plurality of mask segments are independently adjustable along a respective radial axis extending perpendicular to the extrusion axis of the die body to achieve a selected respective radial distance between the corresponding inner peripheral surface portion and the outer peripheral surface of the die body to provide a desired peripheral gap profile defined between the inner peripheral surface portions of the mask segments and the outer peripheral surface of the die body.

In yet another aspect, a method of extruding a honeycomb body from batch material comprises the step of providing a die body including an array of pins that are spaced apart to define an extrusion face with a honeycomb network of discharge slots extending along an extrusion axis of the die body. The die body further includes an outer peripheral surface facing away from the extrusion axis and circumscribing the extrusion face. The die body further includes an outer feed surface circumscribing the outer peripheral surface. The method further includes the step of providing a mask including an inner peripheral surface at least partially circumscribing the outer peripheral surface of the die body. A peripheral gap is defined between the inner peripheral surface and the outer peripheral surface. The method further includes the step of providing a circumferential feed area in fluid communication with the peripheral gap and partially defined by the outer feed surface of the die body. The method also includes the step of providing a first vane including a first face portion, wherein a first axial width of the circumferential feed area is defined between the first face portion and the outer feed surface of the die body. The method further includes the step of providing a second vane including a second face portion spaced radially inward with respect to the first face portion in a radial direction extending perpendicular to the extrusion axis and toward the extrusion axis. A second axial width of the circumferential feed area is defined between the second face portion and the outer feed surface of the die body with the second axial width being different from the first axial width. The method further includes the step of selectively adjusting the first axial width of the circumferential feed area by adjusting the first vane relative to the mask. The method also includes the step of selectively adjusting the second axial width of the circumferential feed area by adjusting the second vane relative to the mask.

BRIEF DESCRIPTION OF THE DRAWINGS

These and other features, aspects and advantages of the claimed invention are better understood when the following detailed description is read with reference to the accompanying drawings, in which:

FIG. 15 is a sectional view along line 15-15 of FIG. 12;

FIG. 16 is another sectional view along line 15-15 of FIG. 12 after adjustment.

DETAILED DESCRIPTION

Figure 1:
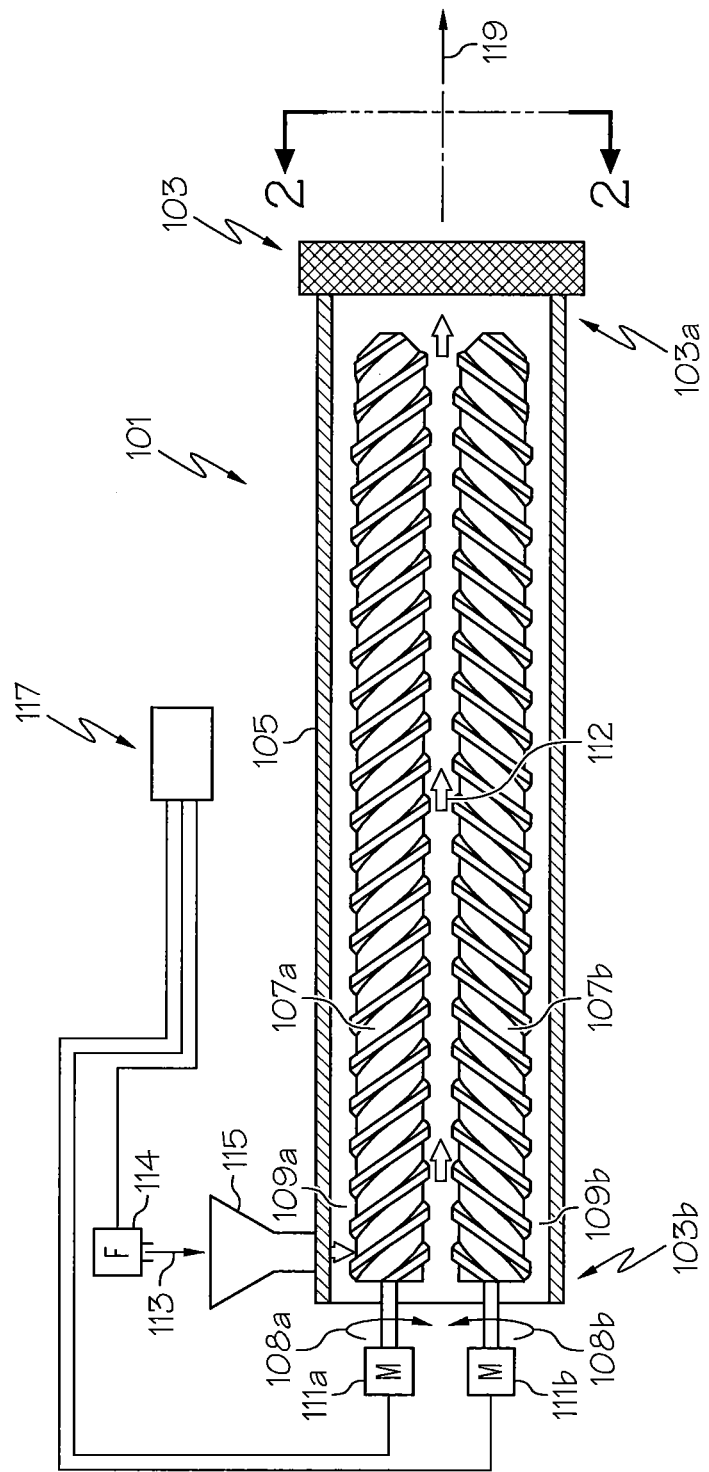
FIG. 1 is a schematic view of an example honeycomb extrusion apparatus in accordance with aspects of the present disclosure.

Aspects of the claimed invention will now be described more fully hereinafter with reference to the accompanying drawings in which example embodiments of the claimed invention are shown. Whenever possible, the same reference numerals are used throughout the drawings to refer to the same or like parts. However, the claimed invention may be embodied in many different forms and should not be construed as limited to the embodiments set forth herein. These example embodiments are provided so that this disclosure will be both thorough and complete, and will fully convey the scope of the claimed invention to those skilled in the art.

A honeycomb body an integral skin can be formed from a batch of a wide variety of materials such as ceramic mixtures. Example the batch material can comprise a ceramic mixture as a paste and/or slurry, such as particles and/or powders mixed with polymer binders and/or low molecular weight liquids and combinations of these and other materials, such as for forming a cement slurry. Various batch materials may be provided that comprise ceramic or ceramic forming material.

As set forth in the figures, example honeycomb extrusion apparatus and methods are provided to allow co-extruding a honeycomb body and integral skin. Honeycomb bodies can include various structures defining a network of cells, whatever the geometry of the cells may be. For example, the cells can comprise curvilinear cells, such as circular, oval or other curvilinear shapes. In further examples, the cells can comprise triangular, rectangular (e.g., square) or other polygonal shapes. Once extruded, the honeycomb body may be later fired into a honeycomb ceramic body. The honeycomb ceramic body can then be further processed for various filtering applications, including, for example, particulate filters and/or catalytic substrates for processing exhaust from a combustion engine.

As shown, the honeycomb extrusion apparatus 101 can considered a die apparatus 103 either alone (e.g. FIGS. 2-17) or in combination with other components (e.g., schematically illustrated in FIG. 1). For instance, as shown schematically in FIG. 1, the honeycomb extrusion apparatus 101 can include the die apparatus 103 mounted to a downstream end 103a of a barrel 105. The honeycomb extrusion apparatus 101 can further include one or more screws 107a, 107b rotatably mounted within the barrel 105. In one example embodiment, the barrel 105 can be shaped to provide a plurality of chambers 109a, 109b that each house a respective screw 107a, 107b rotatably mounted within and in communication with one another at a central portion of the barrel 105. The screws 107a, 107b are powered by at least one drive mechanism 111a, 111b (e.g., motors).

In the illustrated example, one screw 107a includes right-handed threads while the other screw 107b includes left-handed threads. In such a configuration the drive mechanism 111a, 111b can rotate the right-handed screw 107a in a clockwise direction 108a and the left-handed screw 107b in a counterclockwise direction 108b to drive batch material 113 along the barrel 105 from the upstream end 103b in a direction 112 toward the downstream end 103a to be extruded by the die apparatus 103. Although not shown, in further examples, the screws 107a, 107b can each have screw threads provided in the same direction (i.e., both left-handed screws or both right-handed screws) wherein the respective drive mechanisms are configured to rotate the screws 107a, 107b in the same direction to similarly drive the batch material 113 along the barrel 105 along direction 112 to be extruded by the die apparatus 103.

The die apparatus 103 is configured to extrude the batch material 113 in the desired shape, e.g., a honeycomb body along extrusion direction 119. Near the upstream end 103b, a supply port 115 may be provided to allow the batch material 113 from a feeder 114 to enter the chambers 109a, 109b. While this example embodiment shows the supply port 115 at one location near the upstream end 103b, alternate embodiments may provide the supply port 115 further downstream from the upstream end 103b.

The honeycomb extrusion apparatus 101 may optionally include a control system with various configurations. In the illustrated example, the control system 117 can be configured to adjust a rotation rate of the screws 107a, 107b by way of the driving mechanisms 111a, 111b and/or adjust the feed rate of the batch material 113 introduced by the feeder 114.

Figure 2:
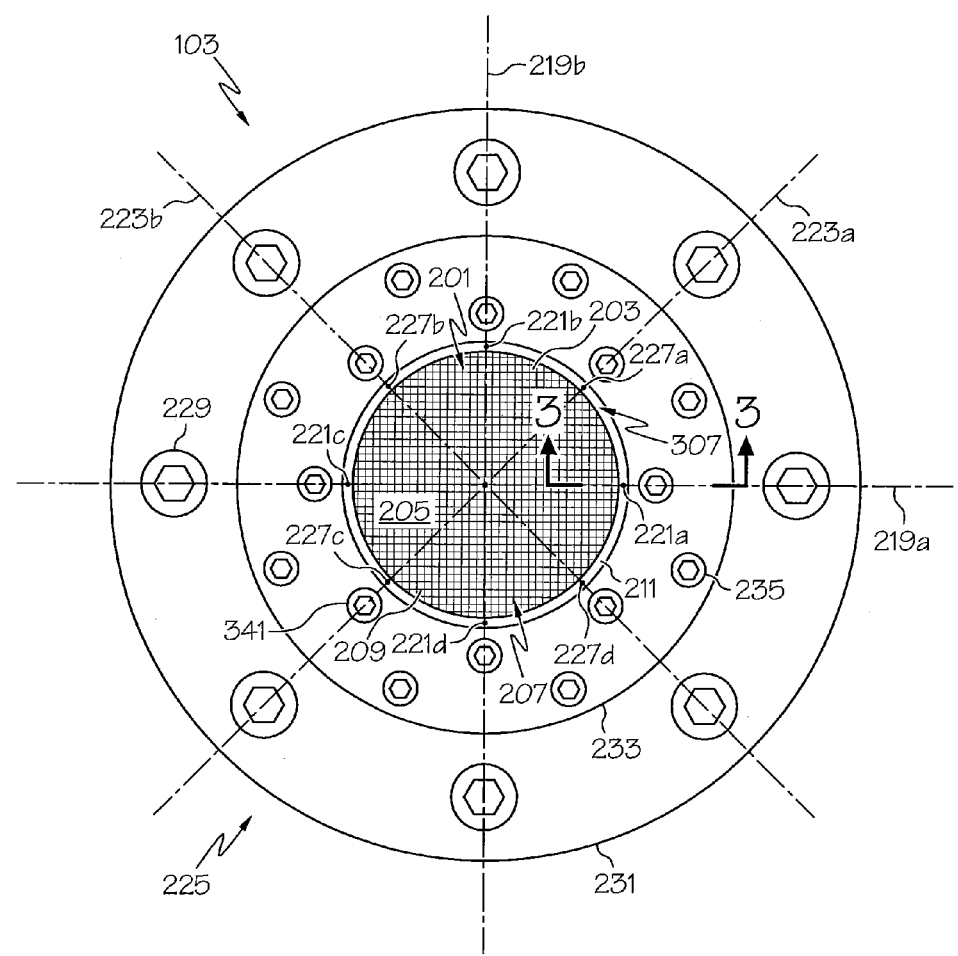
FIG. 2 is a plan view of an example die apparatus of the example honeycomb extrusion apparatus along line 2-2 of FIG. 1.
Figure 3:
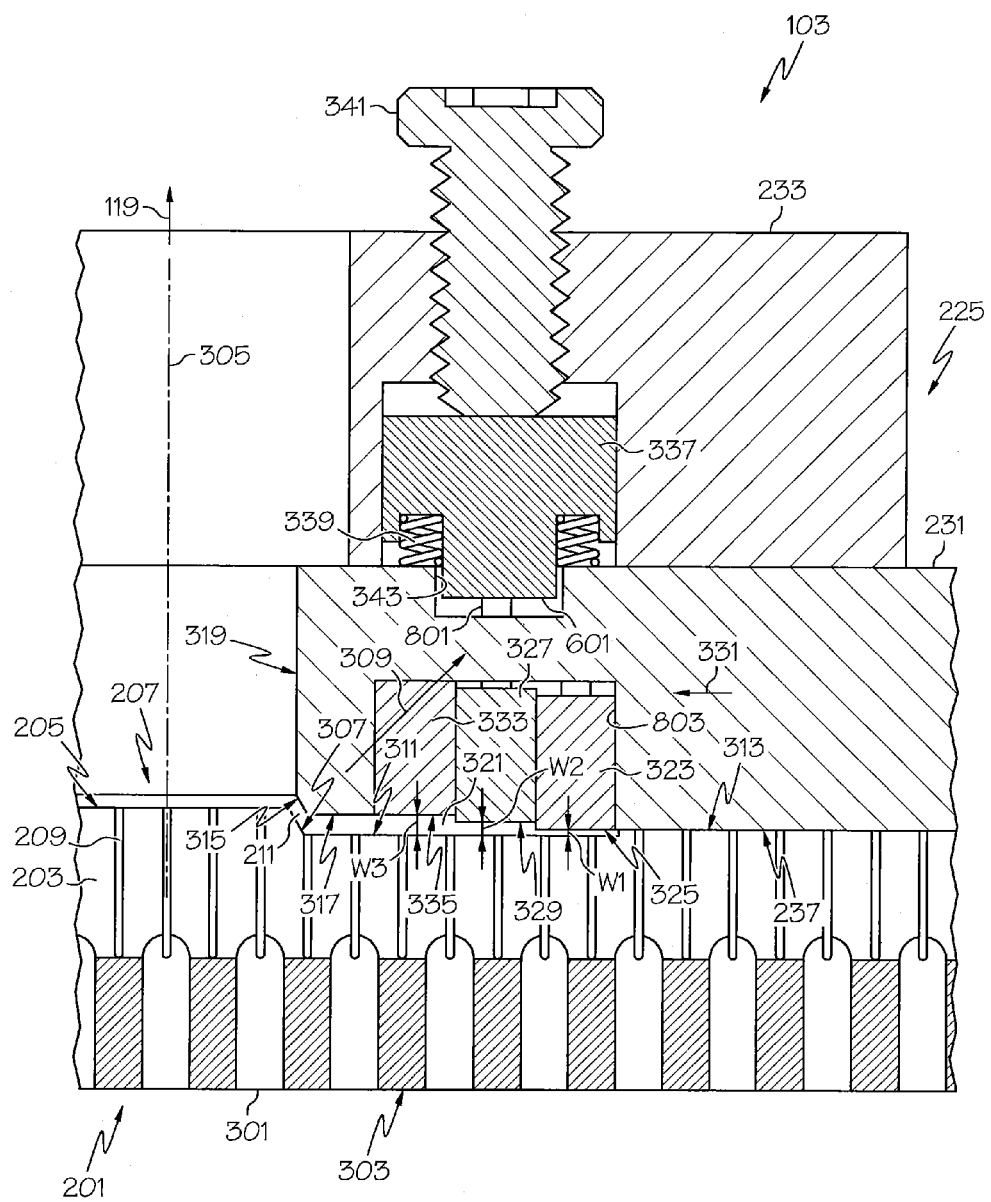
FIG. 3 is a sectional view of the die apparatus along line 3-3 of FIG. 2.

FIGS. 2-8 illustrate just one example die apparatus 103 in accordance with aspects of the disclosure. FIG. 2 is a plan view of an example die apparatus 103 of an example honeycomb extrusion apparatus 101 along line 2-2 of FIG. 1. The die apparatus 103 of the honeycomb extrusion apparatus 101 can include a die body 201 including an array of die pins 203 that are spaced apart to define an extrusion face 205 with a honeycomb network 207 of discharge slots 209. As shown in FIG. 3, the die body 201 can also include feed holes 301 for providing communication between an inlet face 303 and the discharge slots 209. As shown in FIG. 3, in one example, the feed holes 301 can be offset for direct fluid communication with every other discharge slot intersection along each row of discharge slots. The feed holes 301 can also be offset for direct communication with every other discharge slot intersection along each column of discharge slots. Various machining techniques may be used to generate various feed-hole and discharge slot configurations. In one example, the feed holes may be bored into the inlet face 303. Next, various machining techniques are used to form the rows and columns of discharge slots to intersect with the feed holes 301. Various example techniques to form the discharge slots can include wire electronic discharge machining (i.e., wire "EDM"), plunge EDM, grinding, or other machining techniques.

As shown in FIG. 3, the discharge slots 209 may each be provided with substantially the same thickness. Providing the discharge slots 209 with substantially the same thickness can reduce material costs, weight and may enhance performance of the filter while still achieving a honeycomb body that is durable and provides sufficient performance characteristics. In alternative examples, discharge slots 209 may include a varying thickness. For instance, the thickness of the slots within a central area of the extrusion face 205 may include a smaller thickness than discharge slots 209 located about a peripheral region of the extrusion face 205. Providing peripheral discharge slots with a greater thickness than central discharge slots can create a honeycomb body with cell walls that have an increased thickness at the periphery than the central portion of the honeycomb body. In such examples, the increased thickness may enhance integral attachment between the skin and the central portion of the honeycomb body. In addition, the increased thickness of the outer peripheral cell walls can increase the strength of the outer periphery of the honeycomb body when compared to honeycomb bodies with cell walls including substantially the same reduced thickness.

As shown in FIG. 3, the discharge slots 209 can each extend along an extrusion axis 305 of the die body 201. For example, as shown the discharge slots 209 can extend along the extrusion direction 119 that is coincident or parallel to the extrusion axis 305 of the die body 201. The die pins 203 can include a wide range of shapes and sizes in order to define the honeycomb network 207 of discharge slots 209 with the desired configuration to produce corresponding honeycomb bodies with the desired cell structure. As shown in FIG. 2, each of the die pins 203 may be provided as a square shaped die pin although, in addition or alternatively, the die pins can include other shapes. For example, the die pins can include a polygonal shape with three or more sides such as a triangular shape, a rectangular shape (e.g., see the illustrated square shape), a pentagonal shape, a hexagonal shape or other polygonal shape. In further examples, the pin can include curvilinear shapes, such as circular, oval or other curvilinear shapes.

As shown in FIG. 3, the die body 201 further includes an outer peripheral surface 307 facing away (e.g., along direction 309) from the extrusion axis 305 and circumscribing the extrusion face 205. As shown the outer peripheral surface 307 can comprise a frustoconical surface circumscribing the extrusion face 205. Still further, as shown in FIG. 3, the outer peripheral surface 307 can optionally be provided as a circular frustoconical surface although other surface shapes may be used in further examples. Therefore, as shown, in some examples the outer peripheral surface can comprise a circular frustoconical surface that comprises a truncated conical surface extending between the extrusion face 205 and an outer feed surface 311 circumscribing the outer peripheral surface 307. As shown, the outer feed surface 311 may optionally be substantially parallel to the extrusion face 205. As further illustrated, the outer feed surface 311 can further be recessed with respect to a landing surface 313 circumscribing the outer feed surface 311 although the landing surface 313 and outer feed surface 311 may be flush in further examples to form one continuous outer feed surface.

The discharge slots may have different skin flow characteristics at different locations along the outer peripheral surface 307. For example, with the square-shaped die pin configuration shown in FIG. 2, batch flow forming the skin ("skin batch flow") tends to have the lowest resistance at locations of the outer peripheral surface 307 that are aligned with one of a first slot plane 219a and a second slot plane 219b. In contrast, the skin batch flow tends to have the highest resistance at locations along the outer peripheral surface 307 that are aligned with a transverse pin planes 223a, 223b that are located at 45° with respect to the first and second slot planes 219a, 219b.

The highest and lowest resistance to skin batch flow can be influenced, at least in part, by the die pin arrangement of the die body 201. For example, with the square pin configuration shown in FIG. 2, the honeycomb network of discharge slots 209 associated with the outer peripheral surface adjacent the first radial locations (e.g., 221a, 221b, 221c, 221d) at the 0°, 90°, 180°, and 270° positions of a peripheral gap 211 have the least resistance to skin batch flow. Indeed, the first radial locations can be considered the most aligned with the radial slots to receive an ample flow rate of skin batch flow that is relatively uninhibited by the die pins. In contrast, the honeycomb network of discharge slots 209 associated with the outer peripheral surface 307 adjacent the second radial locations (e.g., 227a, 227b, 227c, 227d) at the 45°, 135°, 225°, and 315° positions of the peripheral gap 211 have the most resistance to skin batch flow. Indeed, the second radial locations are generally most misaligned with the radial slots, thereby receiving a relatively restricted flow rate of batch material that is relatively inhibited by the tortuous path produced by the die pin configuration at the second radial locations.

While the areas of least resistance are discussed with respect to the 0°, 90°, 180°, and 270° and the areas of most resistance are discussed with respect to the radial locations 45°, 135°, 225°, and 315°, such locations are for example purposes only. In further examples, it may be determined that the particular honeycomb extrusion apparatus may provide areas of least and/or most resistance at other locations. For example, the above-referenced examples are associated with circular honeycomb substrates. The areas of least and/or most resistance may be determined to occur at different locations for an oval, square, or other shaped honeycomb substrate. Moreover, further process considerations, such as influences from processes upstream from the die body may influence where the areas of most and/or least resistance occur. In such examples, aspects of the present disclosure can be used to provide custom compensation to provide desired relative skin flow characteristics (e.g., balanced skin flow characteristics) at different locations about the outer peripheral surface.

The honeycomb network of discharge slots 209 and/or other features of the honeycomb extrusion apparatus can therefore at least partially define a first skin flow characteristic at the first radial locations 221a, 221b, 221c, 221d. Likewise, the honeycomb network 207 of discharge slots 209 and/or other features of the honeycomb extrusion apparatus at least partially define a second skin flow characteristic at the second radial locations 227a, 227b, 227c, 227d that is different than the first skin flow characteristic. For example, the skin flow characteristics can comprise a resistance of skin batch flow, a thickness of the skin, a volumetric flow rate of the skin batch flow, a velocity of the skin batch flow, a pressure of the skin batch flow, a viscosity of the skin batch flow, a rheology of the skin batch flow, batch particle orientation in the skin batch flow, or other characteristics. In one example, the first skin flow characteristic is different than the second skin flow characteristic.

In just one example, the skin flow characteristic can comprise a resistance of the skin batch flow, wherein the first skin flow characteristic (e.g., first skin batch flow resistance) at the first radial locations 221a, 221b, 221c, 221d is less than the second skin flow characteristic (e.g., second skin batch flow resistance) at the second radial locations 227a, 227b, 227c, 227d. In another example, the skin flow characteristic can comprise a thickness of the skin, wherein the first skin flow characteristic (e.g., first skin thickness) at the first radial locations 221a, 221b, 221c, 221d is greater than the second skin flow characteristic (e.g., second skin thickness) at the second radial locations 227a, 227b, 227c, 227d. In another example, the skin flow characteristic can comprise a volumetric flow rate of the skin batch flow, wherein the first skin flow characteristic (e.g., first volumetric flow rate of the skin batch flow) at the first radial locations 221a, 221b, 221c, 221d is greater than the second skin flow characteristic (e.g., second volumetric flow rate of the skin batch flow) at the second radial locations 227a, 227b, 227c, 227d. In yet another example, the skin flow characteristic can comprise a velocity of the skin batch flow, wherein the first skin flow characteristic (e.g., first velocity of the skin batch flow) at the first radial locations 221a, 221b, 221c, 221d is greater than the second skin flow characteristic (e.g., second velocity of the skin batch flow) at the second radial locations 227a, 227b, 227c, 227d. In still another example, the skin flow characteristic can comprise a pressure of the skin batch flow, wherein the first skin flow characteristic (e.g., first pressure of the skin batch flow) at the first radial locations 221a, 221b, 221c, 221d is greater than the second skin flow characteristic (e.g., second pressure of the skin batch flow) at the second radial locations 227a, 227b, 227c, 227d.

FIGS. 2-8 illustrate one example mask apparatus 225 that can be incorporated as part of the example die apparatus 103. For example, as shown in FIG. 2, fasteners 229 or another attachment mechanism may be used to removably mount the mask apparatus 225 to the die body 201.

As shown in FIG. 3, the mask apparatus 225 can include an inner peripheral surface 315 at least partially circumscribing the outer peripheral surface 307 of the die body 201. As shown, although not required, the inner peripheral surface 315 can comprise a frustoconical surface that can comprise a truncated surface extending between an inwardly facing surface 317 and a skin facing edge surface 319 of the mask apparatus 225.

The peripheral gap 211 can be defined between the inner peripheral surface 315 of the mask apparatus 225 and the outer peripheral surface 307 of the die body 201, wherein the peripheral gap 211 circumscribes the array of die pins 203. The peripheral gap 211 can optionally include varying cross-sectional area configurations about the peripheral gap 211. For example, the peripheral gap 211 can include a first extrusion cross section at the first radial locations 221a, 221b, 221c, 221d with an overall flow area that is less than an overall flow area of a second extrusion cross section at the second radial locations 227a, 227b, 227c, 227d. As such, although not required, the peripheral gap may include varying cross sections to help compensate for the difference in skin flow characteristics. The difference in cross sections, if provided can be obtained by machining one or both of the inner and outer peripheral surfaces to provided differing peripheral gap cross sections depending on the die pin configuration and/or other skin flow characteristics.

Although not required in all examples, FIG. 2 illustrates that the mask apparatus 225 may include a first mask portion 231 and a second mask portion 233. As shown, the first mask portion 231 can be removably mounted to the die body 201 by way of the fasteners 229. The second mask portion 233 can also be mounted to the first mask portion 231 by way of fasteners 235 although other fastening arrangements may be incorporated in further examples. Providing the mask apparatus 225 with a second mask portion 233 that is removable from the first mask portion 231 can simplify fabrication and assembly, facilitate cleaning of the mask apparatus, facilitate retrofitting the mask apparatus, and/or provide further benefits by allowing easy access to internal components of the mask apparatus. Moreover, although not shown, the first mask portion 231 and the second mask portion 233 may be integral in further examples.

As further shown in FIG. 3, the first mask portion 231 can be mounted to the die body 201 such that the discharge slots 209 of the landing surface 313 are blocked by a masking surface 237 of the first mask portion 231. As such, once mounted, the masking surface 237 of the first mask portion 231 can be configured to prevent batch material from flowing through outermost peripheral discharge slots 209 of the die body 201.

The first mask portion 231 may also be provided with a plurality of vanes to allow adjustment of a circumferential feed area 321 that is at least partially defined by the outer feed surface 311 of the die body 201. For example, the plurality of vanes can include a first vane 323 including a first face portion 325. The plurality of vanes can also include a second vane 327 including a second face portion 329 spaced radially inward with respect to the first face portion 325 in a radial direction 331 extending perpendicular to the extrusion axis 305 and toward the extrusion axis 305. Optionally, the plurality of vanes can include a third vane 333 including a third face portion 335 spaced radially inward with respect to the second face portion 329 in the radial direction 331. While two or three vanes may be provided as discussed above, in further examples, any number of vanes may be provided that are sequentially spaced radially inward from one another in the radial direction 331.

As shown, at least one, such as all, of the face portions 325, 329, 335 can optionally comprise a substantially planar face although nonplanar shape portions may be provided in further examples. Moreover, at least one, such as all, of the face portions 325, 329, 335 can optionally be substantially parallel with respect to the outer feed surface 311 although nonparallel configurations may be provided in other examples. Providing a parallel configuration, for example, may allow one or more of the face portions to be adjusted to abut the outer feed surface 311 to inhibit, such as prevent, skin batch flow through selected discharge slots 209 opening into the circumferential feed area 321.

As shown in FIG. 3, a first axial width W1 of the circumferential feed area 321 can be defined between the first face portion 325 of the first vane 323 and the outer feed surface 311 of the die body 201. Likewise, a second axial width W2 of the circumferential feed area 321 can be defined between the second face portion 329 of the second vane 327 and the outer feed surface 311 of the die body 201. Still further, if provided, a third axial width W3 of the circumferential feed area 321 can be defined between the third face portion 335 of the third vane 333 and the outer feed surface 311 of the die body 201. In some of the examples, at least two of the axial widths can be different from one another. For example, the second axial width W2 can be different from the first axial width W1. In further examples, the second axial width W2 can be different from the third axial width W3. In one particular example, the second axial width W2 can be greater than the first axial width W1. The third axial width W3 can be different from at least one of the first and second axial widths W1, W2. For example, as shown, the third axial width W3 can be greater than the second axial width W2. Providing axial widths that are different from one another can allow the adjustment of the skin batch flow within the circumferential feed area 321.

In one example, the vanes 323, 327 and 333 are shown to be separate from one another. As such, the vanes may be easily adjusted relative to one another to provide desired skin batch flow characteristics within the circumferential feed area 321. In further examples, the vanes 323, 327 and 333 may be integral with one another. For instance, the two or more of the vanes may be integrally formed or attached together while providing a particular axial width configuration. Providing an integrally formed vane can be beneficial to reduce moving parts and simplify the design and may be particularly beneficial with applications that do not require subsequent relative adjustment between the vanes.

The plurality of vanes can be adjustably mounted with respect to the mask apparatus. For example, the first vane 323 can be adjustably mounted with respect to the mask apparatus 225 to selectively adjust the first axial width W1. Likewise, the second vane 327 can be adjustably mounted with respect to the mask apparatus 225 to selectively adjust the second axial width W2. Still further, if provided, the third vane 333 can be adjustably mounted with respect to the mask apparatus 225 to selectively adjust the third axial width W3. The vanes can be configured for simultaneous or independent adjustment. For example, as shown in FIG. 3, the vanes 323, 327, 333 are configured for simultaneous axial adjustment along a direction of the extrusion axis 305. As such, movement of one of the vanes by a selected distance results in an identical movement of the remaining vanes by the selected distance.

Various configurations may be provided for allowing the vanes to be axially adjusted relative to the mask apparatus 225. For example, as shown, the die apparatus 103 may be provided with an optional positioning device 337 to facilitate simultaneous axial adjustment of the vanes 323, 327, 333. For instance, as shown the vanes 323, 327, 333 are each mounted to the positioning device 337 such that an adjustment of the positioning device 337 relative to the mask apparatus 225 results in a corresponding adjustment of the axial widths W1, W2, W3.

In still further examples, an actuator device, such as the illustrated adjustment screws 341, can be provided to facilitate adjustment of the location of the positioning device 337 relative to the mask apparatus 225 to provide a corresponding adjustment of the axial widths W1, W2, W3. In some examples, a biasing member 339, such as the illustrated compression spring, may be provided to bias the positioning device away from a portion of the mask apparatus 225. The biasing member 339, if provided, can be designed to force the positioning device 337 against the adjustment screw 341 to increase the friction between the adjustment screw 341 and the mask apparatus 225 to help prevent inadvertent rotation of the adjustment screw 341.

Figure 5:
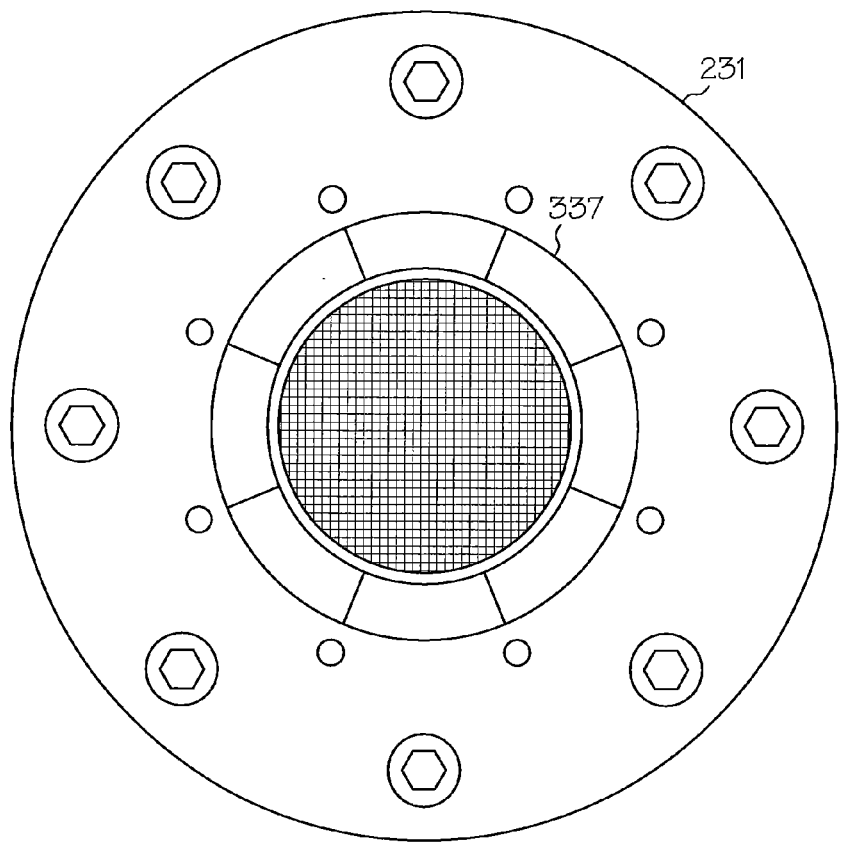
FIG. 5 is a plan view of the die apparatus of FIG. 2 with a second mask portion removed from a first mask portion to expose a plurality of positioning devices.
Figure 6:
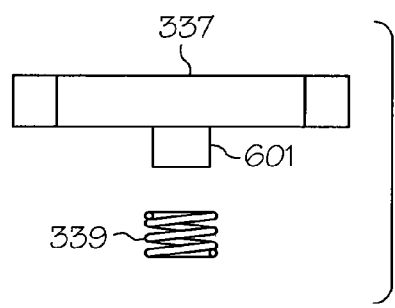
FIG. 6 is an exploded view of a positioning device and biasing member of the die apparatus.
Figure 7:
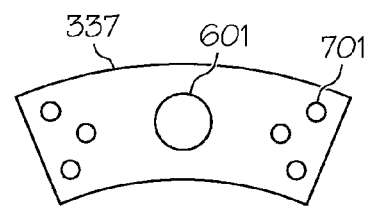
FIG. 7 is a bottom view of the positioning device of FIG. 6.

In some examples, a single positioning device may be provided to provide adjustment of closed-loop vanes that encircle the extrusion face 205 of the die body 201. In further examples, the vanes may be segmented for enhanced radial adjustment about the extrusion face 205. For example, FIG. 5 is a plan view of the die apparatus of FIG. 2 with a second mask portion 233 removed from a first mask portion 231 to expose a plurality of positioning devices 337. Eight positioning devices 337 are shown equally spaced about the periphery although more or less than eight positioning devices may be provided in further examples. Each positioning device 337 can be associated with corresponding segments of the first, second and third vanes. FIG. 6 illustrates a side view of one example positioning device 337. As shown, the positioning device can include a guide pin 601 that may be received in a guide bore 343 (see FIG. 3) defined in the first mask portion 231. The guide pin 601 can reciprocate within the guide bore 343 to define a linear adjustment path along a direction of the extrusion axis 305. FIG. 7 is a bottom view of the positioning device 337 illustrating bore holes 701 configured to receive linking pins 801 illustrated in FIG. 8.

Figure 8:
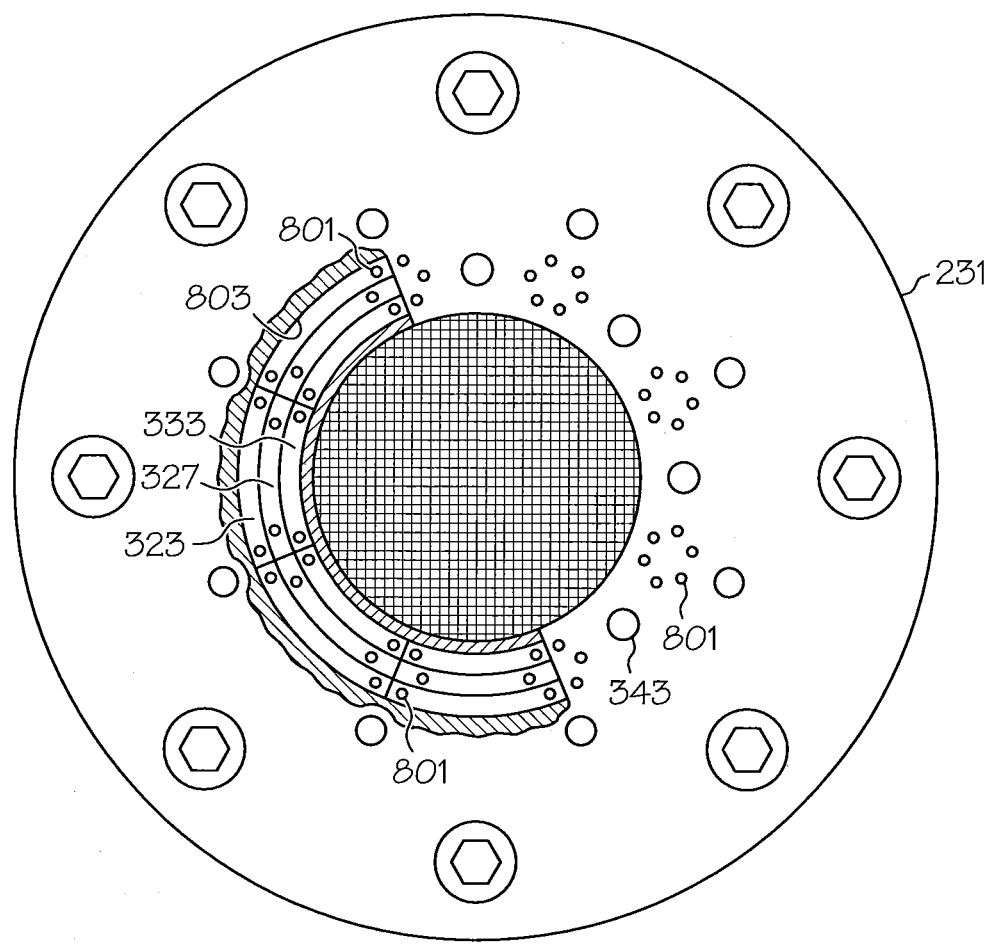
FIG. 8 is a partial sectional view of the first mask portion with the positioning devices removed.

FIG. 8 is a partial sectional view of the first mask portion 231 with the positioning devices 337 removed. As shown the first, second and third vanes 323, 327, 333 are received within the vane cavity 803 of the first mask portion 231. A plurality of linking pins 801 can be provided wherein each linking pin includes a first end seated within a bore hole within one of the vanes 323, 327, 333 and the other end of the linking pin 801 being configured to be seated within a respective bore hole 701 of the corresponding vane 323, 327, 333.

As shown in FIG. 8, the first vane 323 comprises a plurality of first vane segments wherein the first face portion 325 comprises a plurality of first face portion segments that are each associated with a corresponding one of the plurality of first vane segments. As the first vane is segmented, the first axial width W1 comprises a plurality of first axial width portions that are each defined between a corresponding one of the plurality of first face portion segments and the outer feed surface 311 of the die body 201. Each of the plurality of first vane segments can be independently adjustable with respect to the other first vane segments to selectively adjust the corresponding first axial width portion with respect to the other first axial width portions. Likewise, FIG. 8 illustrates that the second and third vanes 327, 333 can comprise a plurality of second and third vane segments wherein the second and third face portions 329, 335 comprises a plurality of second and third face portion segments that are each associated with a corresponding one of the plurality of second and third vane segments. The second and third axial widths W2, W3 can therefore comprise a plurality of second and third axial width portions that are each defined between a corresponding one of the plurality of second and third face portion segments and the outer feed surface 311 of the die body 201. Each of the plurality of second and third vane segments can be independently adjustable with respect to the other second and third vane segments to selectively adjust the corresponding second and third axial width portion with respect to the other second and third axial width portions.

Once assembled, the first, second and third vane segments can define a plurality of vane segment pairs that each include one of the first vane segments, a corresponding one of the second vane segments, and (optionally) a corresponding one of the third vane segments. Each positioning device segment can be independently adjusted, for example, by way of the adjustment screws 341, relative to the mask to independently adjust the corresponding vane segment pair relative to the other vane segment pairs.

Methods of extruding a honeycomb body from batch material will now be described with reference to FIG. 1 and the embodiment of the die apparatus 103 shown in FIGS. 2-8 with the understanding that the methods may be carried out with other example embodiments of the disclosure. As shown in FIGS. 2 and 3, the method can include the step of providing the die body 201 including the array of die pins 203 that are spaced apart to define the extrusion face 205. The extrusion face includes the honeycomb network 207 of discharge slots 209 extending along the extrusion axis 305 of the die body 201. The die body further includes the outer peripheral surface 307 facing away from the extrusion axis 305 and circumscribing the extrusion face 205. The die body 201 still further includes the outer feed surface 311 circumscribing the outer peripheral surface 307.

The method further includes the step of providing the mask apparatus 225 including the inner peripheral surface 315 at least partially circumscribing the outer peripheral surface 307 of the die body 201. The mask apparatus 225 is provided such that the peripheral gap 211 is defined between the inner peripheral surface and the outer peripheral surface.

The method further includes the step of providing the circumferential feed area 321 in fluid communication with the peripheral gap 211 and partially defined by the outer feed surface 311 of the die body 201. The method still further includes the step of providing the first vane 323 including the first face portion 325, wherein the first axial width W1 of the circumferential feed area 321 is defined between the first face portion 325 and the outer feed surface 311 of the die body 201. The method also includes the step of providing the second vane 327 including the second face portion 329 spaced radially inward with respect to the first face portion in the radial direction 331 extending perpendicular to the extrusion axis 305 and toward the extrusion axis 305. The second axial width W2 of the circumferential feed area 321 is defined between the second face portion 329 and the outer feed surface 311 of the die body 201 with the second axial width W2 being different from the first axial width W1.

Figure 4:
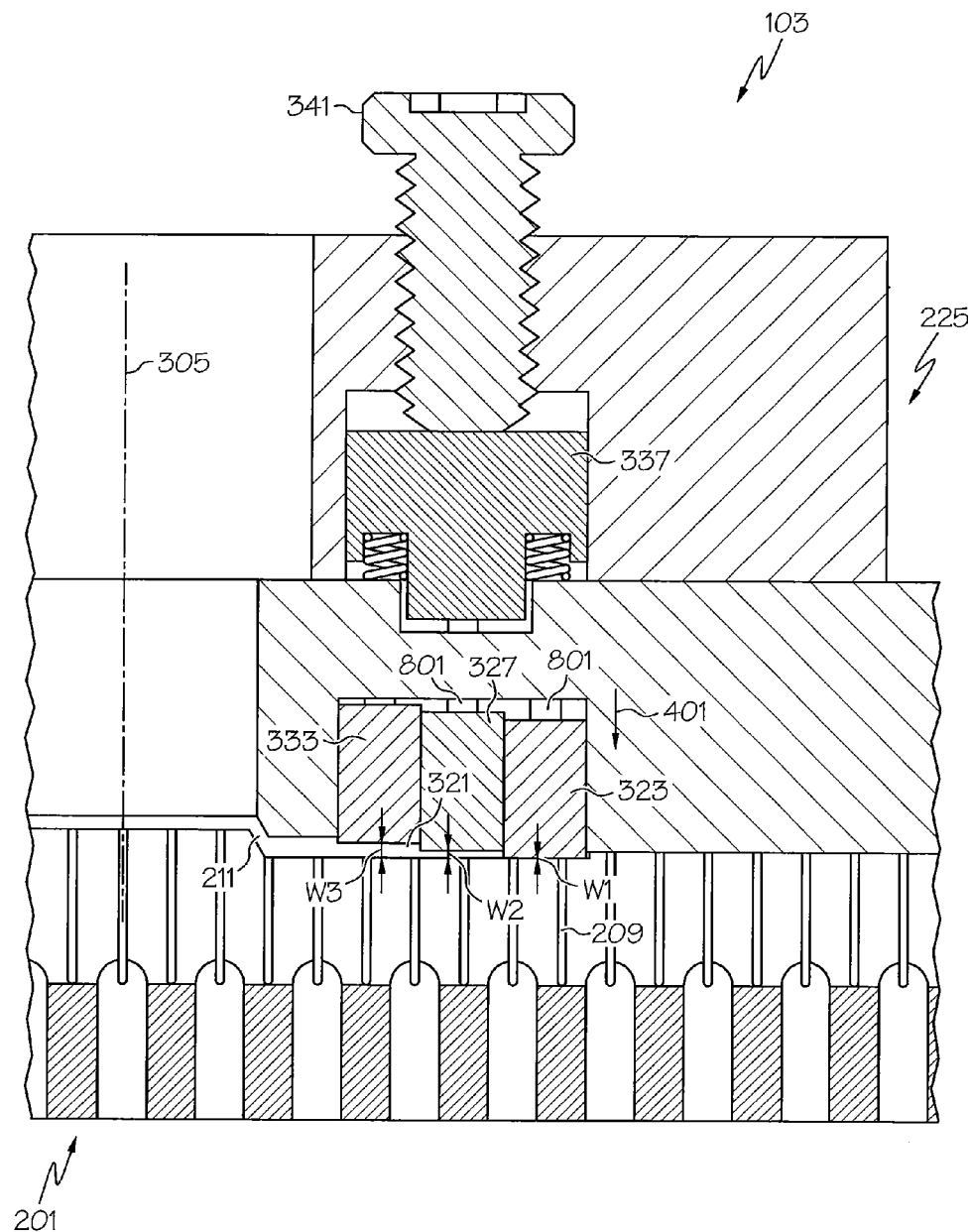
FIG. 4 is another sectional view of the die apparatus along line 3-3 of FIG. 2 after an adjustment.

The method further includes the step of selectively adjusting the first axial width W1 of the circumferential feed area 321 by adjusting the first vane 323 relative to the mask apparatus 225. The method also includes the step of selectively adjusting the second axial width W2 of the circumferential feed area 321 by adjusting the second vane 327 relative to the mask apparatus 225. For example, as shown in FIG. 4, the adjustment screw 341 can be tightened to compress the positioning device 337 to move downward in the direction 401 of the extrusion axis 305. The downward movement of the positioning device 337 results in a corresponding downward movement of the vanes since the linking pins 801 fixedly attach each of the vanes 323, 327, 333 to the positioning device 337. As such, the corresponding axial widths W1, W2, W3 are each reduced by the distance that the positioning device 337 moves downward along direction 401. As such, in one example, the all of the vanes 323, 327, 333 can be adjusted together such that the corresponding axial widths W1, W2, W3 are adjusted by the same amount.

FIG. 4 illustrates a fully extended adjusted position where the adjustment screw 341 is adjusted to the point that the first face portion 325 abuts the outer feed surface 311 such that the first adjusted axial width W1 is reduced to about zero. When the first adjusted axial width W1 is reduced to about zero, the first face portion 325 can act to substantially or completely block off a selected number or portions of the discharge slots 209 as shown in FIG. 4. Moreover, the overall area of the circumferential feed area 321 can be reduced to result in restricted flow of batch material to the corresponding area of the peripheral gap 211. For example, as shown, the second adjusted axial width W2 can be greater than the first adjusted axial width W1. Moreover, as shown, the third adjusted axial width W3 can be greater than the second adjusted axial width W2.

As such, adjustment of the axial widths W1, W2, W3 can help control the flow of batch material through the peripheral gap 211. Moreover, in segmented applications illustrated in FIGS. 2-8, it is possible to selectively adjust the batch material flow at different locations of the peripheral gap 211. Selective adjustment may be beneficial to help compensate for various skin flow characteristics inherent in the honeycomb network 207 of discharge slots 209. For example, as mentioned previously, with the square die pin shape illustrated in FIG. 2, there is less restriction of batch flow at the first radial locations 221a-d than the second radial locations 227a-d. In such an example, the vanes may be adjusted to the position shown in FIG. 4 near the first radial locations 221a-d to restrict the batch material flow at these locations to counter the reduced batch flow restriction due to the honeycomb network of discharge slots. Furthermore, the vanes may be adjusted to the position shown in FIG. 3 near the second radial locations 227a-d to reduce the resistance to batch flow at these locations to counter the restricted batch flow due to the honeycomb network of discharge slots. As such, allowing independent segmented adjustment of the vanes can allow compensation for differences in flow characteristics to stabilize the thickness of the skin or provide other beneficial skin forming characteristics.

Figure 9:
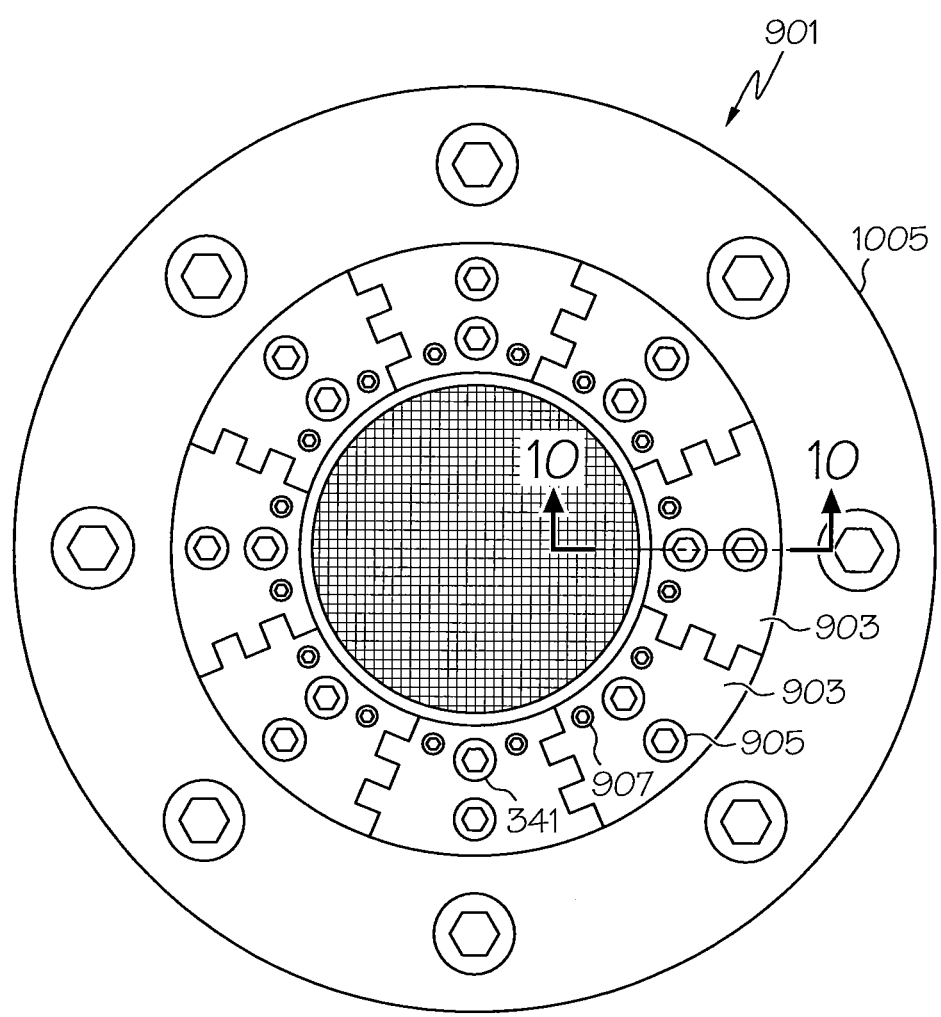
FIG. 9 is a plan view of another example die apparatus along line 2-2 of FIG. 1.
Figure 10:
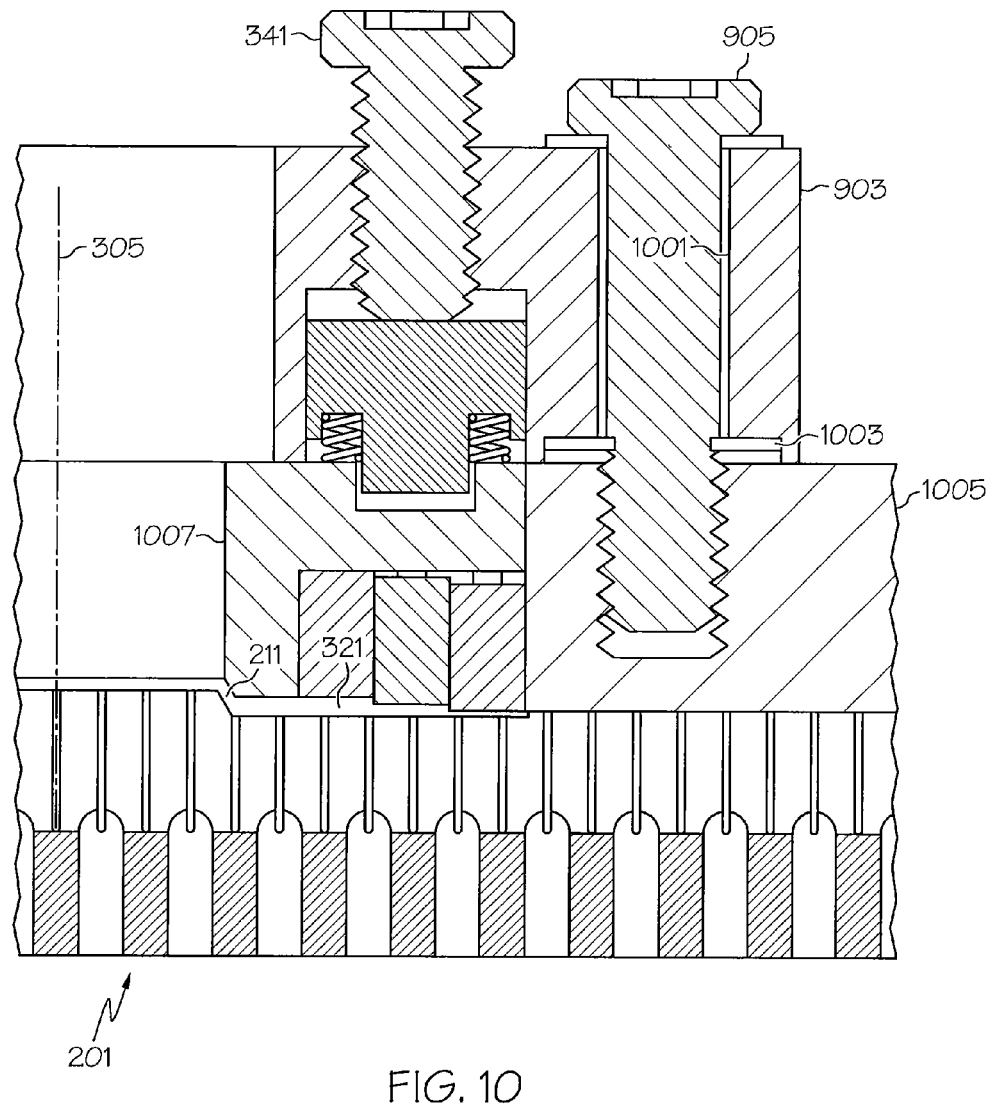
FIG. 10 is a sectional view along line 10-10 of FIG. 9.
Figure 11:
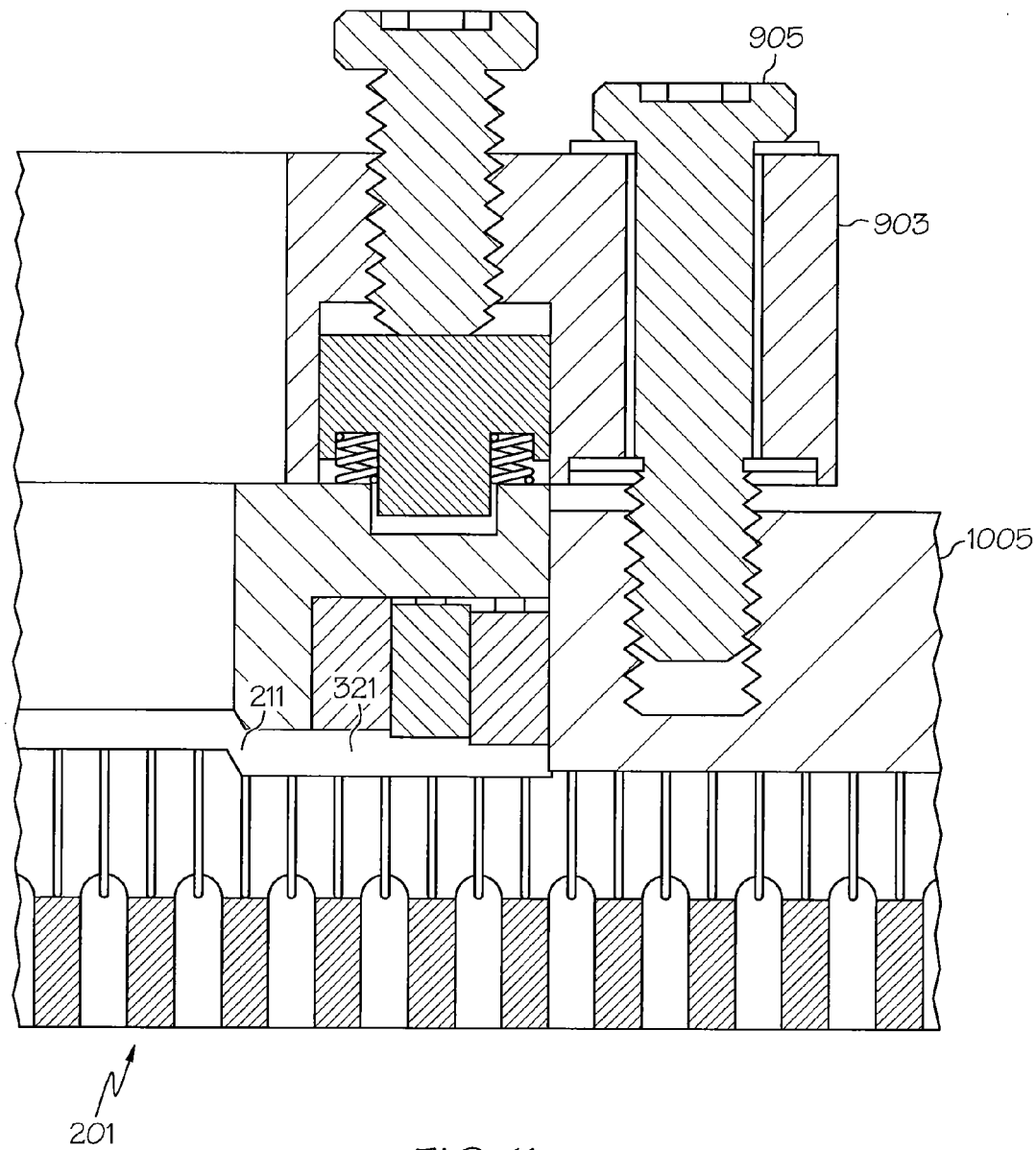
FIG. 11 is another sectional view of the die apparatus along line 10-10 of FIG. 9 after an adjustment.

FIGS. 9-11 illustrate another example die apparatus 901 similar to the die apparatus 103 illustrated in FIGS. 2-8 but allowing adjustment of the peripheral gap 211 in addition to adjustment of the axial width profile of the circumferential feed area 321. As shown in FIG. 9, a plurality of segments 903 may be provided that can be independently adjustable relative to one another along the extrusion axis 305 of the die body 201. For example, each segment 903 may be adjusted along a direction of the extrusion axis 305 by way of a gap adjustment screw 905. As shown in FIG. 10, the gap adjustment screws 905 may be rotatably attached within a rotation bore 1001 by way of a lock washer 1003. Moreover, the first mask portion can include an outer masking circumferential member 1005 fixedly mounted to the die body 201 by way of the fasteners 229. The first mask portion can also include inner segments 1007 fixedly attached to the segment 903 by way of fasteners 907 shown in FIG. 9.

FIG. 11 shows adjustment of the peripheral gap 211 that may be achieved by adjusting the gap adjustment screw 905. As shown, the width of the peripheral gap 211 can be increased when compared to the width of the peripheral gap 211 shown in FIG. 10. As such, increased flow of batch material can also be achieved by adjusting the peripheral gap 211 independently of adjusting the axial width of the circumferential feed area 321 to achieve optimal flow characteristics.

Figure 12:
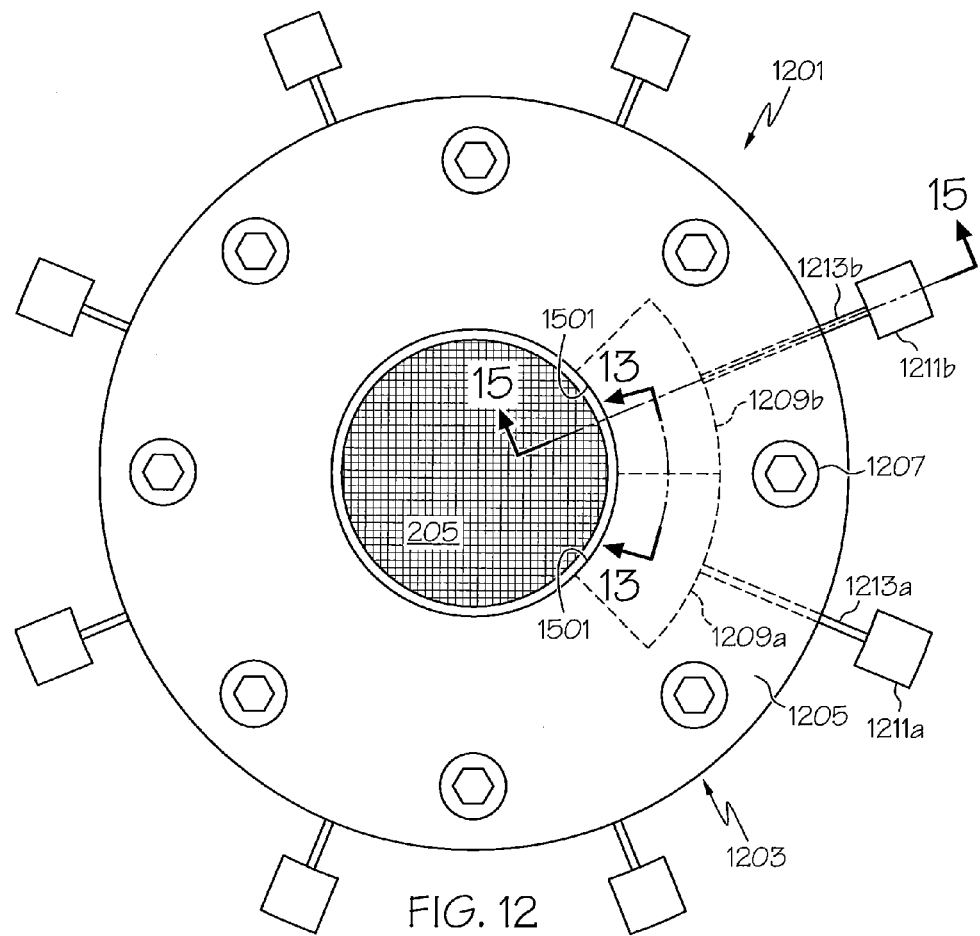
FIG. 12 is a plan view of another example die apparatus along line 2-2 of FIG. 1.

FIGS. 12-17 illustrate another example die apparatus 1201 that may be taken along line 2-2 of FIG. 1. As shown in FIG. 15, the honeycomb extrusion apparatus can include the die body 201 as discussed with respect to FIGS. 2-8 above. As such, with reference to FIGS. 2 and 3, the die body of FIGS. 12-17 can also include the array of die pins 203 that are spaced apart to define the extrusion face 205 with the honeycomb network 207 of discharge slots 209 extending along the extrusion axis 305 of the die body 201. Moreover, the die body includes the outer peripheral surface 307 facing away from the extrusion axis 305 and circumscribing the extrusion face 205. As shown in FIG. 12, the die apparatus 1201 further includes a mask apparatus 1203 including a mask plate 1205 that may be fixedly attached to the die body 201 by way of fasteners 1207.

As shown in FIG. 12, the die apparatus 1201 further includes a plurality of mask segments may be spaced radially about the extrusion face 205. As shown in FIG. 12, two mask segments 1209a, 1209b with corresponding actuators 1211a, 1211b configured to radially extend or retract the mask segments 1209a, 1209b by way of respective extension rods 1213a, 1213b. While two mask segments are illustrated, it will be appreciated that a mask segment and extension rod can be provided with each of the actuators shown in FIG. 12.

As shown in FIG. 15, each mask segment 1209b includes an inner peripheral surface portion 1501. The inner peripheral surface portions 1501 of each mask segment at least partially circumscribe the outer peripheral surface 307 of the die body 201. Each of the plurality of mask segments (e.g., 1209a, 1209b) can be independently adjustable along a respective radial axis 1503 extending perpendicular to the extrusion axis 305 of the die body 201. For example, as shown in FIG. 15, the actuator 1211b may be activated to drive the extension rod 1213b to independently adjust the mask segment 1209b relative to the remaining mask segments to achieve a selected respective radial distance between the corresponding inner peripheral surface portion 1501 and the outer peripheral surface 307 of the die body 201 to provide a desired peripheral gap profile defined between the inner peripheral surface portions of the mask segments and the outer peripheral surface of the die body.

Figure 13:
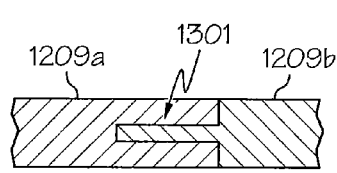
FIG. 13 is a sectional view along line 13-13 of FIG. 12.
Figure 14:
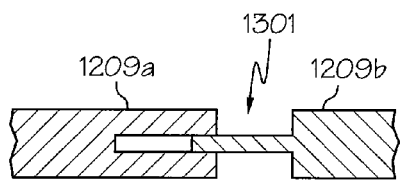
FIG. 14 is another sectional view along line 13-13 of FIG. 12 after adjustment.

As shown in FIG. 13, adjacent mask segments may include a dovetail joint 1301 to allow relative extension and retraction of adjacent mask segments relative to one another without providing a leak path for the batch material. FIG. 13 shows the mask segments 1209a, 1209b in a fully extended position. FIG. 14 shows the mask segments 1209a, 1209b in a fully retracted position wherein the dovetail joint maintains the integrity of the batch material barrier.

In some examples, the die body 201 also includes the outer feed surface 311 circumscribing the outer peripheral surface

307. The honeycomb extrusion apparatus further includes a circumferential feed area 321 in fluid communication with the peripheral gap 211 and at least partially defined by the outer feed surface 311 of the die body 201.

FIG. 15 illustrates the mask segment 1209b in a first position wherein a first gap distance of the peripheral gap 211 is defined by the edge 1505 of the mask plate 1205 and the inner peripheral surface portion 1501 of the mask segment 1209b. FIG. 15 also shows the circumferential feed area 321 being relatively small relative to the circumferential feed area 321 of FIG. 16 discussed below.

FIG. 16 illustrates the mask segment 1209b being retracted such that the peripheral gap distance is only defined by the edge 1505 of the mask plate 1205 and the outer peripheral surface 307 of the die body 201. Moreover, the circumferential feed area 321 is enlarged to reduce the resistance to batch material flow through the peripheral gap.

Figure 17:
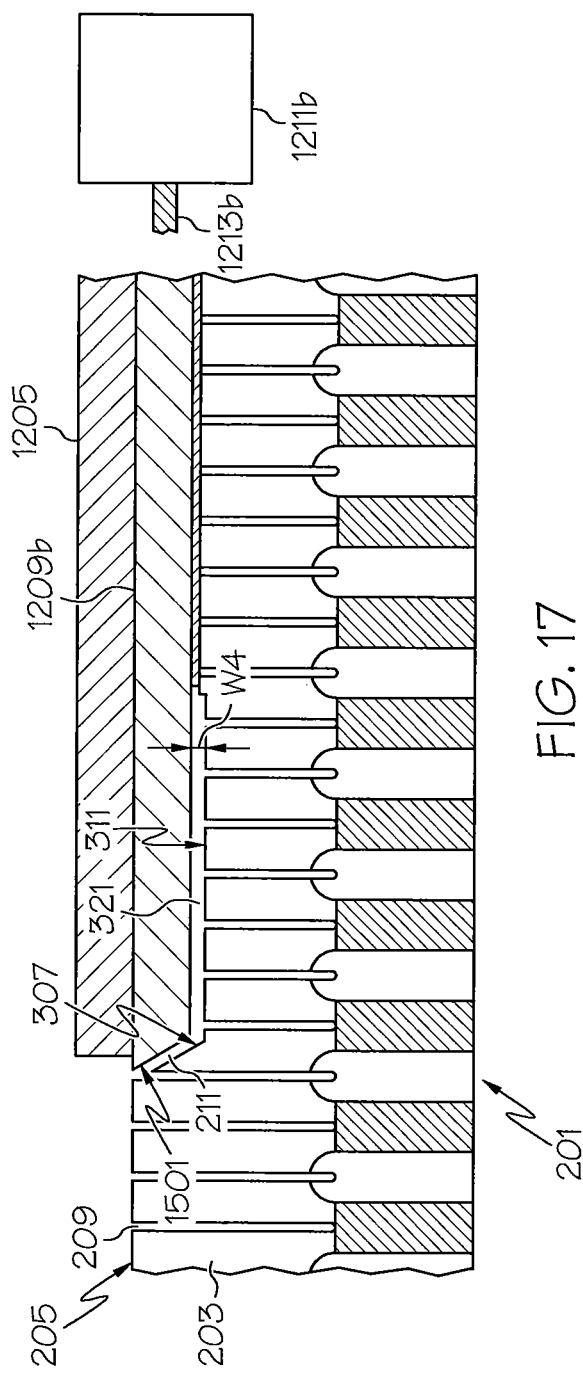
FIG. 17 is still another sectional view along line 15-15 of FIG. 12 after adjustment.

FIG. 17 illustrates the mask segment 1209b being extended relative to the position shown in FIG. 15 such that the peripheral gap distance is only defined by the inner peripheral surface portion 1501 of the mask segment 1209b and the outer peripheral surface 307 of the die body 201. FIG. 17 also shows a slight further restriction of the circumferential feed area 321 relative to the circumferential feed area 321 of FIG. 15 discussed above.

As shown in FIGS. 15 and 17, an axial width "W4" of the circumferential feed area 321 is configured to remain substantially constant during an adjustment at least one of the mask segments along the respective radial axis 1503. Moreover, as shown in FIG. 16, the an axial width "W4" of a portion of the circumferential feed area 321 can also remain substantially constant while another portion of the feed area steps to an axial width "W5" that is substantially greater than the axial width "W4".

It will be apparent to those skilled in the art that various modifications and variations can be made to the described embodiments without departing from the spirit and scope of the claimed invention. Thus, it is intended that the present claimed invention cover the modifications and variations of the embodiments described herein provided they come within the scope of the appended claims and their equivalents.

What is claimed is:

1. A honeycomb extrusion apparatus comprising:
   a die body including an array of pins that are spaced apart to define an extrusion face with a honeycomb network of discharge slots extending along an extrusion axis of the die body, the die body further including an outer peripheral surface facing away from the extrusion axis and circumscribing the extrusion face, and an outer feed surface circumscribing the outer peripheral surface;
   a mask including an inner peripheral surface at least partially circumscribing the outer peripheral surface of the die body, wherein a peripheral gap is defined between the inner peripheral surface and the outer peripheral surface;
   a circumferential feed area in fluid communication with the peripheral gap and partially defined by the outer feed surface of the die body;
   a first vane including a first face portion, wherein a first axial width of the circumferential feed area is defined between the first face portion and the outer feed surface of the die body, wherein the first vane is adjustably mounted with respect to the mask to selectively adjust the first axial width; and
   a second vane including a second face portion spaced radially inward with respect to the first face portion in a radial direction extending perpendicular to the extrusion axis and toward the extrusion axis, wherein a second axial width of the circumferential feed area is defined between the second face portion and the outer feed surface of the die body with the second axial width being different from the first axial width, and wherein the second vane is adjustably mounted with respect to the mask to selectively adjust the second axial width.

2. The honeycomb extrusion apparatus of claim 1, wherein the second axial width is greater than the first axial width.

3. The honeycomb extrusion apparatus of claim 1, wherein the first vane comprises a plurality of first vane segments, the first face portion comprises a plurality of first face portion segments that are each associated with a corresponding one of the plurality of first vane segments, and the first axial width comprises a plurality of first axial width portions that are each defined between a corresponding one of the plurality of first face portion segments and the outer feed surface of the die body, wherein each of the plurality of first vane segments is independently adjustable with respect to the other first vane segments to selectively adjust the corresponding first axial width portion with respect to the other first axial width portions.

4. The honeycomb extrusion apparatus of claim 1, wherein the second vane comprises a plurality of second vane segments, the second face portion comprises a plurality of second face portion segments that are each associated with a corresponding one of the plurality of second vane segments, and the second axial width comprises a plurality of second axial width portions that are each defined between a corresponding one of the plurality of second face portion segments and the outer feed surface of the die body, wherein each of the plurality of second vane segments is independently adjustable with respect to the other second vane segments to selectively adjust the corresponding second axial width portion with respect to the other second axial width portions.

5. The honeycomb extrusion apparatus of claim 1, further comprising a third vane including a third face portion, wherein a third axial width of the circumferential feed area is defined between the third face portion and the outer feed surface of the die body with the third axial width being different from at least one of the first and second axial widths, wherein the third vane is adjustably mounted with respect to the mask to selectively adjust the third axial width.

6. The honeycomb extrusion apparatus of claim 5, wherein the third vane comprises a plurality of third vane segments, the third face portion comprises a plurality of third face portion segments that are each associated with a corresponding one of the plurality of third vane segments, and the third axial width comprises a plurality of third axial width portions that are each defined between a corresponding one of the plurality of third face portion segments and the outer feed surface of the die body, wherein each of the plurality of third vane segments is independently adjustable with respect to the other third vane segments to selectively adjust the corresponding third axial width portion with respect to the other third axial width portions.

7. The honeycomb extrusion apparatus of claim 5, wherein the third face portion is spaced radially inward with respect to the second face portion in the radial direction.

8. The honeycomb extrusion apparatus of claim 5, wherein the second axial width is greater than the first axial width.

9. The honeycomb extrusion apparatus of claim 5, wherein the third axial width is greater than the second axial width.

10. The honeycomb extrusion apparatus of claim 1, further comprising a positioning device, wherein the first and second vanes are each mounted to the positioning device such that an adjustment of the positioning device relative to the mask results in a corresponding adjustment of the first and second axial widths.

11. The honeycomb extrusion apparatus of claim 10, wherein the first vane comprises a plurality of first vane segments, the second vane comprises a plurality of second vane segments, and the positioning device comprises a plurality of positioning device segments, wherein the first and second vane segments define a plurality of vane segment pairs that each include one of the first vane segments and a corresponding one of the second vane segments, and each of the plurality of vane segment pairs are mounted to a corresponding one of the positioning device segments, and wherein each of the positioning device segments are independently adjustable relative to the mask to independently adjust the corresponding vane segment pair relative to the other vane segment pairs.

12. The honeycomb extrusion apparatus of claim 10, further comprising a biasing member configured to bias the positioning device away from a portion of the mask.

13. The honeycomb extrusion apparatus of claim 10, further comprising an actuator device configured to adjust the location of the positioning device relative to the mask to result in the corresponding adjustment of the first and second axial widths.

14. A method of extruding a honeycomb body from batch material comprising the steps of:
(I) providing a die body including an array of pins that are spaced apart to define an extrusion face with a honeycomb network of discharge slots extending along an extrusion axis of the die body, the die body further including an outer peripheral surface facing away from the extrusion axis and circumscribing the extrusion face, and an outer feed surface circumscribing the outer peripheral surface;
(II) providing a mask including an inner peripheral surface at least partially circumscribing the outer peripheral surface of the die body, wherein a peripheral gap is defined between the inner peripheral surface and the outer peripheral surface;
(III) providing a circumferential feed area in fluid communication with the peripheral gap and partially defined by the outer feed surface of the die body;
(IV) providing a first vane including a first face portion, wherein a first axial width of the circumferential feed area is defined between the first face portion and the outer feed surface of the die body;
(V) providing a second vane including a second face portion spaced radially inward with respect to the first face portion in a radial direction extending perpendicular to the extrusion axis and toward the extrusion axis, wherein a second axial width of the circumferential feed area is defined between the second face portion and the outer feed surface of the die body with the second axial width being different from the first axial width;
(VI) selectively adjusting the first axial width of the circumferential feed area by adjusting the first vane relative to the mask; and
(VII) selectively adjusting the second axial width of the circumferential feed area by adjusting the second vane relative to the mask.

15. The method of claim 14, wherein the first and second vane are adjusted together such that the first and second axial widths are adjusted by the same amount.

16. The method of claim 14, wherein step (VI) adjusts the first axial width to a first adjusted axial width and step (VII) adjusts the second axial width to a second adjusted axial width that is greater than the first axial width.

17. The method of claim 14, wherein step (VI) adjusts the first axial width to about 0 and step (VII) adjusts the second axial width to greater than 0.

\* \* \* \* \*